(12) United States Patent
Bass et al.

(10) Patent No.: US 7,078,505 B2
(45) Date of Patent: Jul. 18, 2006

(54) MANUFACTURE OF ARRAYS WITH VARYING DEPOSITION PARAMETERS

(75) Inventors: Jay K. Bass, Mountain View, CA (US); Maryam Mobed-Miremadi, Sunnyvale, CA (US); Michelle M. Maranowski, San Jose, CA (US); Roy H. Kanemoto, Palo Alto, CA (US); Bill J. Peck, Mountain View, CA (US); Eric M. Leproust, Campbell, CA (US); Michael P. Caren, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 392 days.

(21) Appl. No.: 10/165,783

(22) Filed: Jun. 6, 2002

(65) Prior Publication Data

US 2003/0228422 A1    Dec. 11, 2003

(51) Int. Cl.
*C07H 21/04* (2006.01)
*C12Q 1/68* (2006.01)
*C12M 1/36* (2006.01)

(52) U.S. Cl. .................. 536/23.1; 536/25.3; 435/6; 435/283.1; 435/287.2

(58) Field of Classification Search ............. 435/6, 435/174, 283.1, 287.2; 536/23.1, 25.3
See application file for complete search history.

(56) References Cited

U.S. PATENT DOCUMENTS

| | | | |
|---|---|---|---|
| 5,790,150 A * | 8/1998 | Lidke et al. | 347/41 |
| 5,847,105 A * | 12/1998 | Baldeschwieler et al. | 536/25.3 |
| 6,180,351 B1 | 1/2001 | Cattell | |
| 6,232,072 B1 | 5/2001 | Fisher | |
| 6,242,266 B1 | 6/2001 | Schleifer et al. | |
| 6,251,595 B1 | 6/2001 | Gordon et al. | |
| 6,300,137 B1 * | 10/2001 | Earhart et al. | 436/94 |
| 6,306,599 B1 | 10/2001 | Perbost | |
| 6,323,043 B1 | 11/2001 | Caren et al. | |
| 6,372,483 B1 | 4/2002 | Schleifer et al. | |
| 6,589,739 B1 | 7/2003 | Fisher | |
| 6,599,693 B1 | 7/2003 | Webb | |
| 6,613,893 B1 | 9/2003 | Webb | |
| 6,656,740 B1 | 12/2003 | Caren et al. | |
| 2002/0055102 A1 * | 5/2002 | Stern | 435/6 |
| 2003/0112295 A1 | 6/2003 | DaQuino et al. | |
| 2003/0143329 A1 | 7/2003 | Shchegrova et al. | |
| 2003/0143756 A1 | 7/2003 | Fisher et al. | |
| 2004/0002072 A1 | 1/2004 | Barth et al. | |
| 2004/0005614 A1 | 1/2004 | Kurn et al. | |
| 2004/0009608 A1 | 1/2004 | Caren et al. | |

* cited by examiner

*Primary Examiner*—B J Forman

(57) ABSTRACT

Methods are disclosed for synthesizing a plurality of compounds on the surface of supports. The synthesis comprises a series of cycles of steps in which reagents for conducting the synthesis are deposited on the surface of the support to form the chemical compounds. At least one physical parameter of the deposition varies between cycles The method comprises conducting the synthesis in at least two sets of cycles, arbitrarily designated as a first set and a second set. Each cycle comprises at least one step of depositing reagents on a surface by means of droplet dispensing elements that traverse the surface of the support. At least one, and desirably all, of the following deposition parameters are employed as indicated: The number of times of repetition for a step of depositing reagents in at least one cycle of the second set is less than the number of times of repetition for a corresponding step in at least one cycle of the first set. The rate of deposition in at least one cycle of the second set is slower than or equal to the rate of deposition in at least one cycle of the first set. The rate of traversal of the dispensing elements over the surface of the support in at least one cycle of the second set is greater than such rate of traversal in at least one cycle of the first set.

40 Claims, No Drawings

MANUFACTURE OF ARRAYS WITH VARYING DEPOSITION PARAMETERS

BACKGROUND OF THE INVENTION

This invention relates to the manufacturing of supports having bound to the surfaces thereof a plurality of chemical compounds such as polymers, which are prepared on the surface in a series of steps. More particularly, the present invention relates to methods for solid phase chemical synthesis, particularly solid phase synthesis of oligomer arrays, or attachment of oligonucleotides and polynucleotides to surfaces, e.g., arrays of polynucleotides, wherein reagents are deposited as droplets on the surface of a support.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays and polypeptide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen-bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated using either in situ synthesis methods or deposition of the previously obtained biopolymers. The in situ synthesis methods include those described in U.S. Pat. No. 5,449,754 for synthesizing peptide arrays, as well as WO 98/41531 and the references cited therein for synthesizing polynucleotides (specifically, DNA). Such in situ synthesis methods can be basically regarded as iterating the sequence of depositing droplets of: (a) a protected monomer onto predetermined locations on the surface of a support to link with either a suitably activated surface or with a previously deposited deprotected monomer; (b) deprotecting the deposited monomer so that it can now react with a subsequently deposited protected monomer; and (c) depositing another protected monomer for linking. Different monomers may be deposited at different regions on the substrate during any one iteration so that the different regions of the completed array will have different desired biopolymer sequences. One or more intermediate steps may be required in each iteration such as, for example, oxidation and washing steps.

In the deposition methods biopolymers are deposited at predetermined locations on support surface that is suitably activated such that the biopolymers can become linked to the surface. Biopolymers of different sequence may be deposited at different regions of the substrate to yield a completed array. Washing or other additional steps may also be used.

Typical procedures are known in the art for deposition of polynucleotides, particularly DNA such as whole oligomers or cDNA. One such procedure involves loading a small volume of DNA in solution in one or more drop dispensers such as the tip of a pin or in an open capillary and, touch the pin or capillary to the surface of the substrate. Such a procedure is described in U.S. Pat. No. 5,807,522. When the fluid touches the surface, some of the fluid is transferred. The pin or capillary must be washed prior to picking up the next type of DNA for spotting onto the array. This process is repeated for many different sequences and, eventually, the desired array is formed.

In another approach reagents for in situ synthesis or DNA can be loaded into a drop dispenser in the form of an inkjet head and fired onto the surface of the support. Such a technique has been described, for example, in PCT publications WO 95/25116 and WO 98/41531, and elsewhere. This method has the advantage of non-contact deposition. Multiple inkjet heads may be employed and the heads are adapted to scan the surface of a support to deposit reagents at predetermined locations. Other methods involve pipetting apparatus and positive displacement pumps such as, for example, the Biodot equipment available from Bio-Dot Inc., Irvine Calif., USA.

Droplet deposition of reagents usually comprises depositing more than one droplet of reagent on to the surface of a support in any one step of the synthesis to create a single feature of an array of features. Desirably, the configuration of each individual feature should be circular with minimal diameter so that, when an array of features is employed in a diagnostic method, the features may each be read with maximum discrimination between features. Thus, each feature should be distinct. However, dispensing multiple drops in one step of multiple steps to create a single feature often can result in non-circular, e.g., oval, features that have a diameter that is larger than desired.

There is a need, therefore, for a method for fabricating a multiplicity of features on the surface of a support using droplet dispensing technology where each feature is distinct from the other. Desirably, each drop dispensed to a feature site should approximate a spherical drop. The method should provide for conservation of reagents employed in the synthetic methods. In use, each feature should be able to be read with appropriate technology to obtain reliable data from each distinct feature site.

SUMMARY OF THE INVENTION

One embodiment of the present invention is a method for synthesizing an array of polymers on the surface of a support. The method comprising initiating multiple cycles of depositing drops of reagents onto the surface of the support from drop dispensing elements, which elements optionally traverse the surface of the support, wherein at least one physical parameter of the drop deposition varies between cycles. The multiple cycles are completed to form the array of polymers.

Another embodiment of the present invention is a method for synthesizing a plurality of chemical compounds such as polymers on the surface of a support. The synthesis comprises a series of cycles of steps in which reagents for conducting the synthesis are deposited on the surface of the support to form the chemical compounds. The method comprises conducting the synthesis in at least two sets of cycles, arbitrarily designated as a first set and a second set. Each cycle comprises at least one step of depositing reagents on a surface by means of droplet dispensing elements that traverse the surface of the support. In accordance with the present invention, (a) the number of times of repetition for a step of depositing reagents in at least one cycle of the second set is less than the number of times of repetition for a corresponding step in at least one cycle of the first set, and/or (b) the rate of deposition in at least one cycle of the second set is less than or equal to the rate of deposition in at least one cycle of the first set, and/or (c) the rate of traversal of the dispensing elements over the surface of the support in at least one cycle of the second set is greater than such rate of traversal in at least one cycle of the first set.

Another embodiment of the present invention is a method for synthesizing a plurality of biopolymers on the surface of a support. The synthesis comprises cycles of steps in which reagents for conducting the synthesis are deposited on the surface of the support to form the biopolymers. The reagents are deposited by droplet dispensing elements, which traverse the surface of the support. The present methods employ at least two sets of cycles. In one set of cycles, a cycle comprises X number of the following steps: (i) dispensing to the surface a first reagent for forming the biopolymers wherein the first reagent is dispensed by means of a plurality of droplet dispensing elements, which dispense the first reagent N number of times at a rate of A times per second, wherein the first reagent may be the same as, or different from, the first reagent of a previous step of the cycle, and (ii) dispensing to the surface a second reagent for forming the biopolymers wherein the second reagent is dispensed by means of a plurality of droplet dispensing elements, which dispense the second reagent N' number of times at a rate of A' times per second, and wherein the second reagent may be the same as, or different from, the second reagent of a previous step of the cycle and wherein the droplet dispensing elements traverse the surface of the support at a rate of traversal T and wherein N and N' and A and A' may be the same or different. In another set of cycles, a cycle comprises Y number of the following steps: (i) dispensing to the surface a third reagent for forming the biopolymers wherein the third reagent is dispensed by means of a plurality of droplet dispensing elements, which dispense the third reagent M number of times at a rate of B times per second wherein in at least one cycle of the sets of cycles M is less than N and B is greater than A, wherein the third reagent may be the same as, or different from, the third reagent of a previous step of the cycle, and (ii) dispensing to the surface a fourth reagent for forming the biopolymers wherein the fourth reagent is dispensed by means of a plurality of droplet dispensing elements, which dispense the fourth reagent M' number of times at a rate of B' times per second wherein in at least one cycle of the sets of cycles M is less than N and B is greater than A, wherein the fourth reagent may be the same as, or different from, the fourth reagent of a previous step of the cycle and wherein the droplet dispensing elements traverse the surface of the support at a rate of traversal U that in at least one cycle of the sets of cycles is greater than T and wherein M and M' and B and B' may be the same or different. The biopolymers may be polynucleotides or polypeptides. The method has particular application to the synthesis of an array of biopolymers on the surface of a support.

DETAILED DESCRIPTION OF THE INVENTION

The present methods and apparatus may be employed in the synthesis of a plurality of chemical compounds on supports with particular application to such synthesis on a commercial scale. Usually, the chemical compounds are those that are synthesized in a series of steps such as, for example, the addition of building blocks, which are chemical components of the chemical compound. Examples of such building blocks are those found in the synthesis of polymers. We have found that distinct features may be produced at sites on the surface of a support by adjusting several parameters involved with the dispensing of multiple droplets during the synthetic procedures for producing the chemical compounds at respective feature sites. Particular parameters of interest include the speed at which the dispensing elements scan the surface of a support during droplet deposition (scan speed), and/or the frequency at which drops are dispensed to the surface of the support (dispensing frequency), and/or the number of drops that are dispensed to the surface of a support during a particular synthetic step (number of drops dispensed). In accordance with the present invention, the scan speed is relatively slow in early cycles of the synthesis of the chemical compounds and is increased in later cycles of the synthesis. The dispensing frequency is higher in early cycles of the synthesis and is decreased in later cycles. The number of drops dispensed in early cycles is reduced in later cycles of the synthesis.

As mentioned above, the chemical compounds are those that are synthesized in a series of steps, which usually involve linking together building blocks that form precursors of the chemical compound and ultimately the chemical compound itself. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The support to which a plurality of chemical compounds is attached is usually a porous or non-porous water insoluble material. The support can have any one of a number of shapes, such as strip, plate, disk, rod, particle, and the like. The support can be hydrophilic or capable of being rendered hydrophilic or it may be hydrophobic. The support is usually glass such as flat glass whose surface has been chemically activated to support binding or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly(ethylene terephthalate), nylon, poly(vinyl butyrate), etc.; either used by themselves or in conjunction with other materials; ceramics, metals, and the like. Preferably, for packaged arrays the support is a non-porous material such as glass, plastic, metal and the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The apparatus and methods of the present invention are particularly useful in the synthesis of arrays of biopolymers. A biopolymer is a polymer of one or more types of repeating units relating to biology. Biopolymers are typically found in biological systems (although they may be made synthetically) and particularly include polysaccharides such as carbohydrates and the like, poly(amino acids) such as peptides including polypeptides and proteins, and polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one, two or three dimensional arrangement of addressable regions bearing a particular chemical moiety or moieties such as, for example, biopolymers, e.g., one or more polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present methods and apparatus may be used in the synthesis of polypeptides. The synthesis of polypeptides involves the sequential addition of amino acids to a growing peptide chain. This approach comprises attaching an amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Sciences* 232, 341–347. After polypeptide synthesis is complete, acid is used to remove the remaining terminal protecting groups. In accordance with the present invention each of certain repetitive steps involved in the addition of an amino acid is carried out in a different flow cell that is dedicated to that repetitive step. Such repetitive steps may involve, among others, washing of the surface, protection and deprotection of certain functionalities on the surface, oxidation or reduction of functionalities on the surface, and so forth.

The present invention has particular application to the synthesis of arrays of chemical compounds on a surface of a support. Typically, methods and apparatus of the present invention generate or use an array assembly that may include a support carrying one or more arrays disposed along a surface of the support and separated by inter-array areas. Normally, the surface of the support opposite the surface with the arrays does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 cm$^2$ or even less than 10 cm$^2$. For example, features may have widths (that is, diameter, for a round spot) in the range from a 10 µm to 1.0 cm. In other embodiments each feature may have a width in the range of 1.0 µm to 1.0 mm, usually 5.0 µm to 500 µm, and more usually 10 µm to 200 µm. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. At least some, or all, of the features may be of different compositions. For example, when any repeats of each feature composition are excluded the remaining features may account for at least 5%, 10%, or 20% of the total number of features. Each array may contain multiple spots or features and each array may be separated by spaces or areas. It will also be appreciated that there need not be any space separating arrays from one another. Interarray areas and interfeature areas are usually present but are not essential. These areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interarray areas and interfeature areas, when present, could be of various sizes and configurations.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

Ordered arrays containing a large number of oligonucleotides have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

The synthesis of arrays of polynucleotides on the surface of a support usually involves attaching an initial nucleoside or nucleotide to a functionalized surface. The surface may be functionalized as discussed above. In one approach the surface is reacted with nucleosides or nucleotides that are also functionalized for reaction with the groups on the surface of the support. Methods for introducing appropriate amine specific or alcohol specific reactive functional groups into a nucleoside or nucleotide include, by way of example, addition of a spacer amine containing phosphoramidites, addition on the base of alkynes or alkenes using palladium mediated coupling, addition of spacer amine containing activated carbonyl esters, addition of boron conjugates, formation of Schiff bases.

After the introduction of the nucleoside or nucleotide onto the surface, the attached nucleotide may be used to construct the polynucleotide by means well known in the art. For example, in the synthesis of arrays of oligonucleotides, nucleoside monomers are generally employed. In this embodiment an array of the above compounds is attached to the surface and each compound is reacted to attach a nucleoside. Nucleoside monomers are used to form the polynucleotides usually by phosphate coupling, either direct phosphate coupling or coupling using a phosphate precursor such as a phosphite coupling. Such coupling thus includes the use of amidite (phosphoramidite), phosphodiester, phosphotriester, H-phosphonate, phosphite halide, and the like coupling.

One preferred coupling method is phosphoramidite coupling, which is a phosphite coupling. In using this coupling method, after the phosphite coupling is complete, the resulting phosphite is oxidized to a phosphate. Oxidation can be effected with iodine to give phosphates or with sulfur to give phosphorothioates. The phosphoramidites are dissolved in anhydrous acetonitrile to give a solution having a given ratio of amidite concentrations. The mixture of known chemically compatible monomers is reacted to a solid support, or further along, may be reacted to a growing chain of monomer units. In one particular example, the terminal 5'-hydroxyl group is caused to react with a deoxyribonucleoside-3'-O—(N,N-diisopropylamino)-phosphoramidite protected at the 5'-position with dimethoxytrityl or the like. The 5' protecting group is removed after the coupling reaction, and the procedure is repeated with additional protected nucleotides until synthesis of the desired polynucleotide is complete. For a more detailed discussion of the chemistry involved in the above synthetic approaches, see, for example, U.S. Pat. No. 5,436,327 at column 2, line 34, to column 4, line 36, which is incorporated herein by reference in its entirety.

Various ways may be employed to introduce the reagents for producing an array of polynucleotides on the surface of a support such as a glass support. Such methods are known in the art and include methods involving dispensing reagents to the surface of a support in the form of droplets. One in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers, in the form of phosphoramidites, and other reagents as necessary such as an activator, e.g., tetrazole, are applied to the surface of a support by means of ink-jet technology. Individual droplets of reagents are applied to reactive areas on the surface using, for example, an ink-jet type nozzle (e.g., thermal or piezo). The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

For in situ fabrication methods, multiple different reagent droplets are deposited on the surface of a support at a given target location in order to form the final feature (hence a probe of the feature is synthesized on the array substrate). Deposition may be by, for example, pulse jet or other similar means. The in situ fabrication methods include those described in U.S. Pat. No. 5,449,754 for synthesizing peptide arrays, and in U.S. Pat. No. 6,180,351 and WO 98/41531 and the references cited therein for polynucleotides, and may also use pulse jets for depositing reagents. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate back side and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

The foregoing chemistry of the synthesis of polynucleotides is described in detail, for example, in Caruthers, Science 230: 281–285, 1985; Itakura, et al., Ann. Rev. Biochem. 53: 323–356; Hunkapillar, et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, 5,869,643 and European patent application, EP 0294196, and elsewhere. The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992.

In the case of array fabrication, different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in a flooding procedure).

As is well known in the art of ink jet printing, the amount of fluid that is expelled in a single activation event of a pulse jet can be controlled by adjusting the orifice diameter, the orifice length (thickness of the orifice member at the orifice), the size of the deposition chamber, and the amount of energy imparted to the fluid. The amount of fluid that is expelled during a single activation event is generally in the range about 0.1 to about 1000 pL, usually about 0.5 to about 500 pL and more usually about 1.0 to about 250 pL. Atypical velocity at which the fluid is expelled from the chamber is more than about 1 meter per second, usually more than about 10 meters per second, and may be as great as about 20 meters per second or more. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the spots can have widths (such as, for example, diameter for a round spot) in the range from a minimum of about 10 μm to a maximum of about 1.0 cm. In embodiments where very small spot sizes or feature sizes are desired, material can be deposited according to the invention in small spots whose width is in the range about 1.0 µm to about 1.0 mm, usually about 5.0 µm to about 500 µm, and more usually about 10 µm to 200 µm.

As mentioned above, the present method involves conducting the synthesis of chemical compounds on the surface of a support. The synthesis may be carried out in at least two sets of cycles, which may arbitrarily be referred to as a first set and a second set. The total number of cycles in a particular synthesis depends primarily on the number of additions that are required to form a growing chain thereby producing the desired chemical compound at the feature site.

As indicated above, each cycle comprises at least one step of depositing reagents on a surface by means of droplet dispensing elements that traverse the surface of the support. The number of sets of cycles is at least two so that one or more of the deposition parameters in at least one cycle in one set can be varied with respect to one or more corresponding parameters in at least one cycle in another set. The number of sets of cycles may be as great as necessary to achieve the objectives of the present invention in preparing a chemical compound of predetermined length such as, e.g., a polymer chain. The number of sets of cycles may be as great as about 70 where at least one of the deposition parameters in at least one cycle of a preceding set may be varied with respect to such parameters in at least one cycle of a subsequent set. Thus, the number of cycles is in the range of about 2 to about 70, more usually, about 25 to about 60. Usually, at least one of the deposition parameters in a majority of cycles in one set are varied with respect to such parameters in a majority of cycles in a subsequent set. Preferably, several or all of the deposition parameters in all of the cycles of one set are varied with respect to such parameters in all of the cycles in a subsequent set.

In one aspect of the present invention the number of times of repetition for each step of depositing reagents in at least one cycle of the second set of cycles is less than the number of times of repetition for each such step in at least one cycle of the first set of cycles. In other words, and the number of drops that are dispensed to the surface of a support during a particular synthetic step is greater in early cycles of the synthesis than in later cycles of the synthesis. In general, the number of drops of reagent dispensed is dependent on the nature of the reagents, e.g., viscosity, surface tension, contact angle and the like, the nature of the surface of the support, e.g., hydrophilic, hydrophobic, and the like, the drop size and head design, the desired density of the deposited material on the support, and so forth. In early cycles of the synthesis, the number of drops dispensed in a step may be in the range of 2 to 50 depending on the above factors. By way of illustration and not limitation, for a drop having a volume in the range of about 30 to about 50 picoliter (pL), a desired viscosity of about 2 to about 3 centipoise (cP), the number of drops dispensed is usually about 2 to about 5, more usually, about 3 to about 4. In general, as the volume of the drop decreases, the number of drops increases. In later cycles of the synthesis, the number of drops dispensed is a fraction of the number of drops dispensed in the earlier cycles. The number of drops dispensed in later cycles may be about 0.75 to about 0.25 times, usually, about 0.5 times, the number of drops dispensed in earlier cycles. By way of illustration and not limitation, for a drop having a volume in the range of about 30 to about 50 pL, a desired viscosity of about 2 to about 3 cP, the number of drops dispensed is usually about 1 to about 4, more usually, about 1 to about 3. Based on the above disclosure and illustrative examples, one skilled in the art will be able to apply the present invention to a variety of dispensing apparatus.

The number of cycles in a particular set of cycles is dependent on the nature of the chemical compounds synthesized, the nature of the synthesis employed, the nature of the reagents (e.g., viscosity, surface tension, contact angle) and the like, the nature of the surface of the support (e.g., whether the surface is hydrophilic, hydrophobic, etc.), and drop size and head design and so forth. As mentioned above, the number of drops dispensed to the surface of a support in a step of the early cycles of the synthesis is greater than the number dispensed in later cycles. Accordingly, the number of cycles in a set that represents earlier cycles is generally less than the number of cycles in a set that represents later cycles to the extent that reagent usage and degradation of dispensing elements and other equipment involved in the dispensing process is minimized. The number of cycles in early sets is usually about 1 to about 30, more usually, about 5 to about 10. The number of cycles in subsequent sets is usually about 10 to about 30, more usually, about 10 to about 20.

The number of steps in a cycle is dependent on the nature of the chemical compounds synthesized, the nature of the synthesis, the nature of the reagents, and so forth. The number of steps in a cycle of the synthesis is at least one, usually, at least two, and is usually as great as required to synthesize the particular chemical compounds. It should be noted that the factors involved with repeated steps, where multiples of the same reagent are deposited, are analogous to the above factors for number of drops.

Another deposition parameter that is varied in accordance with the present invention is the rate of deposition of drops. In general, the rate of deposition in at least one step of a synthesis in subsequent cycles (i.e., cycles following previous or earlier cycles) is less than or equal to the rate of deposition in at least one corresponding step (i.e., the same or similar step) in earlier cycles. When not equal, the rate of deposition in one step is usually slower by a factor of about 0.3 to about 0.9, more usually, slower by a factor of about 0.5 to about 0.75, times the rate of deposition in another step, usually, a previous step. The rate of deposition in an early cycle may be about 5,000 to about 40,000 times per second, usually, about 5,000 to about 20,000 times per second. As mentioned above, the rate of deposition in a subsequent cycle is usually less than or equal to that in the early cycles.

In another aspect of the present invention the rate of traversal of the dispensing elements over the surface of the support in subsequent cycles is greater than such rate of traversal in earlier cycles. The rate of traversal in an early cycle may be about 10 millimeters per second (mm/sec) to about 2 meters/sec, usually, about 120 mm/sec to about 1 meter per second. The rate of traversal in a subsequent cycle is greater than that in an earlier cycle by a factor of at least about 1.2, usually, at least about 1.5 and usually in the range of about 1.2 to about 2.0, usually about 1.4 to about 1.6.

As mentioned above, the steps of capping, oxidation and deprotection can be accomplished by treating the entire surface of a support with a layer of the appropriate reagent, which is often referred to as a flooding step. Some or all of the above steps may be performed using flow cells. Accordingly, for example, after addition of a nucleoside monomer, such as depositing the reagent using an ink jet method, the support is placed into a chamber of a flow cell, which is typically a housing having a reaction cavity or chamber disposed therein. The flow cell allows fluids to be passed through the chamber where the support is disposed. The support may be mounted in the chamber in or on a holder. The housing usually further comprises at least one fluid inlet and at least one fluid outlet for flowing fluids into and through the chamber in which the support is mounted. In one approach, the fluid outlet may be used to vent the interior of the reaction chamber for introduction and removal of fluid by means of the inlet. On the other hand, fluids may be introduced into the reaction chamber by means of the inlet with the outlet serving as a vent and fluids may be removed from the reaction chamber by means of the outlet with the inlet serving as a vent.

The inlet of the flow cell is usually in fluid communication with an element that controls the flow of fluid into the flow cell such as, for example, a manifold, a valve, and the like or combinations thereof. This element in turn is in fluid communication with one or more fluid reagent dispensing stations. In this way different fluid reagents for one step in the synthesis of the chemical compound may be introduced sequentially into the flow cell. These reagents may be, for example, wash fluids, oxidizing agents, reducing agents, blocking or protecting agents, unblocking (deblocking) or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

The support may be transported by a transfer element such as a robotic arm, and so forth. In one embodiment a transfer robot is mounted on a main platform of an apparatus for carrying out the above syntheses. The transfer robot may comprise a base, an arm that is movably mounted on the base, and an element for grasping the support during transport that is attached to the arm. The element for grasping the support may be, for example, movable finger-like projections, and the like. In use, the robotic arm is activated so that the support is grasped by the above-mentioned element. The arm of the robot is moved so that the support is delivered to the flow cell.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

One or more flow cells may be employed. Using as an example the synthesis of polynucleotides on a surface by the phosphoramidite method, the step of oxidation of phosphite to phosphate may be carried out in a dedicated flow cell. Accordingly, following addition of a monomer and discovery of an error in deposition, the support may be placed in the flow cell. Various fluid dispensing stations are connected by means of a manifold and suitable valves to the inlet of the flow cell. Each of the fluid dispensing stations contains a different fluid reagent involved in performing the particular steps involved in the specific cycle of the reaction scheme. Thus, in this example, one station may contain an oxidizing agent for oxidizing the phosphite to the phosphate and another station may contain a wash reagent such as acetonitrile.

After the printing step in any one cycle, the support may be removed from the printing chamber and placed in a flow cell. Wash reagent is first allowed to pass into and out of the flow cell. Next, oxidizing agent is introduced into the flow cell. The support is then subjected to a deblocking step, which may be carried out in the same flow cell or a different flow cell. Accordingly, the support may be transported from a first flow cell to a second flow cell. At this point, a deblocking reagent for removing a protecting group is allowed to pass into and out of the second flow cell. The deblocking reagent is contained in a fluid dispensing station that is in fluid communication with the second flow cell. Next, wash reagent contained in a fluid dispensing station that is in fluid communication with the second flow cell is passed into and out of the second flow cell. Following the above synthetic steps, the support is transported from the second flow cell to the printing chamber where the next monomer addition is carried out and the above repetitive synthetic steps are conducted as discussed above.

The following example of a method in accordance with the present invention is present by way of illustration and not limitation. As indicated above, the present invention has application to a wide variety of syntheses of chemical compounds wherein liquid reagents are delivered dropwise to the surface of a support. In the method below an array of polynucleotide features is synthesized in situ on the surface of a support using phosphoramidite coupling as described above. The reagents delivered as droplets are phosphoramidite reagents and an activating agent, namely, tetrazole. The phosphoramidite reagents (0.340 M) are standard reagents from Applied Biosystems (Foster City, Calif.). The tetrazole in generally present in a suitable solvent. in an amount of about 1.5 M. The length of polynucleotides synthesized on the surface of the support is 60 nucleotides (60 mer). Accordingly, 60 cycles of reagent deposition as well as subsequent oxidation, deblocking and so forth are employed. The cycles are divided into three sets, namely, a first set, a second set and a third set. An ink-jet printer is employed and the size of the droplets is such that 3 drops at one location makes about a spot that is about 130 microns in diameter. In the first set the number of drops of reagent dispensed to the surface of the support is 4 for the phosphoramidite reagents and 4 for the tetrazole reagent. In the second set the number of drops of reagent dispensed to the surface of the support is 3 for the phosphoramidite reagents and 3 for the tetrazole reagent. In the third set the number of drops of reagent dispensed to the surface of the support is 2 for the phosphoramidite reagents and 2 for the tetrazole reagent. For this example, the rate or frequency at which the droplets are applied in the first set is 6 kHz; the rate at which the droplets are applied in the second set is 3 kHz (0.5 times the rate of the first set); and the rate at which the droplets are applied in the third set is 3 kHz (0.5 times the rate of the first set). The rate at which the ink-jet print heads traverse the surface of the support in the first set is 80 mm/s (millimeters per second); the rate in the second set is 120 mm/s (1.5 times the rate of the first set); and the rate in the third set is 240 mm/s (3 times the rate of the first set). The above is summarized in Table 1. In the above example, desired feature sizes of 155 micron in diameter were obtained and the features had the desired circular shape.

TABLE 1

| | Cycles | | |
|---|---|---|---|
| | First set | Second set | Third set |
| No. of cycles | 10 | 20 | 30 |
| No. of drops | 4 + 4 | 3 + 3 | 2 + 2 |
| Traversal speed | 80 mm/s | 120 mm/s | 240 mm/s |

In an alternative to the above specific embodiment, the length of polynucleotides synthesized on the surface of the support is again 60 nucleotides (60 mer). Accordingly, 60 cycles of reagent deposition as well as subsequent oxidation, deblocking and so forth are employed. The cycles are divided into two sets as indicated in the table below. An ink-jet printer is employed. In the first set the number of drops of reagent dispensed to the surface of the support is 3 for the phosphoramidite reagents and 3 for the tetrazole reagent. In the second set the number of drops of reagent dispensed to the surface of the support is 2 for the phosphoramidite reagents and 2 for the tetrazole reagent. The rate at which the droplets are applied in the first set is 6 kHz and the rate at which the droplets are applied in the second set is 6 kHz. The rate at which the ink-jet print heads traverse the surface of the support in the first set is 120 mm/s and the rate in the second set is 240 mm/s. The above is summarized in Table 2 below. In the above example, desired feature sizes of 130 microns were obtained and the features had the desired circular shape.

TABLE 2

| | Cycles | |
|---|---|---|
| | First set | Second set |
| No. of cycles | 10 | 50 |
| No. of drops | 3 + 3 | 2 + 2 |
| Traversal speed | 120 mm/s | 240 mm/s |

In general, the methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

The variation in the deposition parameters from cycle to cycle or set of cycles to set of cycles is controlled by employing appropriate software. Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FORTRAN and C++. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) placing a support into a chamber for printing a predetermined arrangement of features on the surface of the support, (ii) dispensing droplets of reagents for a specific cycle of chemical reactions involved in the synthesis of compounds at the feature sites wherein the number of droplets dispensed, and/or the rate of dispensing the droplets and/or the speed at which the dispensing devices traverse the surface of the support are controlled from earlier sets of cycles to subsequent sets of cycles, (iii) moving the support to a chamber for flooding of the support surface with a reagent involved in the synthesis of the chemical compounds, (iv) removing the support from the housing chamber, (v) placing the support into a chamber of a flow device, (vi) introducing a fluid reagent for conducting a reaction step into the reagent chamber, (vii) removing the fluid reagent from the reagent chamber, (viii) removing the support from the housing chamber and (ix) moving the support to the printing chamber to conduct the next cycle in the synthesis of the chemical compound.

Another aspect of the present invention is a computer program product comprising a computer readable storage medium having a computer program stored thereon which, when loaded into a computer, performs a method as disclosed herein.

Following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent applications: Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A method for synthesizing an array of polymer features on the surface of a support, said method comprising (a) initiating multiple cycles of drop deposition of reagents onto the surface of the support from drop dispensing elements, which elements optionally traverse the surface of the support, wherein each cycle comprises at least one step of deposition of monomers or polymer subunits and at least one step of deposition of an activation agent, (b) varying at least one physical parameter of the drop deposition between cycles and (c) completing said multiple cycles to form said array of polymer features wherein the at least one physical parameter is number of drops to each desired polymer feature location, rate of drop deposition, or rate of traversal.

2. A method according to claim 1 wherein, in subsequent cycles of said method, the number of drops decreases, the rate of deposition decreases, or the rate of traversal increases.

3. A method for synthesizing a plurality of biopolymers on a surface of a support wherein said synthesis comprises steps in which reagents for conducting said synthesis are deposited on the surface of the support to form said biopolymers, said method comprising conducting said synthesis in at least two sets of cycles, a first set and a second set, each cycle comprising at least one step of depositing monomers or polymer subunits on a surface and at least one step of depositing an activation agent on the surface by means of droplet dispensing elements that traverse the surface of said support, wherein said first set and said second set are repeated to form said biopolymers and wherein:

(a) the number of times of repetition for a step in at least one cycle of said second set is less than the number of times of repetition for a corresponding step in at least one cycle of said first set, and/or (b) the rate of deposition in at least one cycle of said second set is less than the rate of deposition in at least one cycle of said first set, and/or (c) the rate of traversal in at least one cycle of said second set is greater than the rate of traversal in at least one cycle of said first set.

4. A method according to claim 3 wherein the number of times of repetition for a step in at least one cycle of said second set is less than 3.

5. A method according to claim 3 wherein the number of times of repetition for a step in a corresponding cycle of said first set is greater than 3.

6. A method according to claim 3 wherein the rate of deposition in a cycle of said method in said first set is at least 5000 times per second.

7. A method according to claim 3 wherein the rate of deposition in a cycle of said method in said second set is less than 0.75 times the rate in a cycle in the first set.

8. A method according to claim 3 wherein the rate of traversal of said droplet-dispensing elements in a cycle of said method in said first set is at least 120 millimeters per second.

9. A method according to claim 3 wherein the rate of traversal of said droplet-dispensing elements in a cycle of said method in said second set is at least 1.5 times the speed in a cycle in said first set.

10. A method according to claim 3 wherein said biopolymers are polynucleotides or polypeptides.

11. A method according to claim 10 wherein said biopolymers are polynucleotides and said polymer subunits are phosphoramidite reagents.

12. A method according to claim 3 wherein said reagents comprise a first reagent and a third reagent and said first reagent and said third reagent are biomonomers or biopolymer subunits activated for reaction on said surface.

13. A method according to claim 12 wherein said reagents comprise a second reagent and a fourth reagent and said second reagent and said fourth reagent are an activation agent.

14. A method according to claim 12 wherein said activation agent is a tetrazole.

15. A method according to claim 3 wherein a number of steps in a cycle of said first set is 1 to about 25.

16. A method according to claim 3 wherein a number of steps in a cycle of said second set is 1 to about 25.

17. A method for synthesizing a plurality of biopolymers on a surface of a support wherein said synthesis comprises steps in which reagents for conducting said synthesis are deposited on the surface of the support to form said biopolymers by droplet dispensing elements, said method comprising:

(a) a first set of cycles wherein each cycle of said method comprises the following steps, which are repeated X number of times:

(i) dispensing to a surface of a support a first reagent for forming biopolymers wherein said first reagent is a biomonomer or biopolymer subunit and is dispensed at predetermined locations by means of a plurality of droplet dispensing elements, all of which dispense said first reagent N number of times at a rate of A times per second, wherein said first reagent may be the same as, or different from, said first reagent of a previous step of said cycle, and (ii) dispensing to said surface a second reagent for forming said biopolymers wherein said second reagent is dispensed at predetermined locations by means of a plurality of droplet dispensing elements, all of which dispense said second reagent N' number of times at a rate of A' times per second, wherein said second reagent may be the same as, or different from, said second reagent of a previous step of said cycle and wherein said droplet dispensing elements traverse the surface of said support at a rate of traversal T, wherein N and N' and A and A' may be the same or different, (b) a second set of cycles wherein each cycle of said method comprises the following steps, which are repeated Y number of times:

(i) dispensing to said surface a third reagent for forming said biopolymers wherein said third reagent is a biomonomer or biopolymeric subunit dispensed by means of a plurality of droplet dispensing elements, all of which dispense said third reagent M number of times at a rate of B times per second wherein in at least one cycle of the sets of cycles M is less than N and B is less than or equal to A, wherein said third reagent may be the same as, or different from, said third reagent of a previous step of said cycle, and (ii) dispensing to said surface a fourth reagent for forming said biopolymers wherein said fourth reagent is dispensed by means of a plurality of droplet dispensing elements, all of which dispense said fourth reagent M' number of times at a rate of B' times per second wherein M and M' and B and B' may be the same or different and wherein in at least one cycle of the sets of cycles M' is less than N' and B' is less than or equal to A' and wherein said fourth reagent may be the same as, or different from, said fourth reagent of a previous step of said cycle and wherein said droplet dispensing elements traverse the surface of said support at a rate of traversal U that in at least one cycle is greater than T, and (c) repeating said first set of cycles of said method and said second set of cycles of said method to form said plurality of biopolymers.

18. A method according to claim 17 wherein said biopolymers are polynucleotides or polypeptides.

19. A method according to claim 17 wherein said first reagent and said third reagent are nucleotide monomers or polynucleotide subunits activated for reaction on said surface.

20. A method according to claim 19 wherein said nucleotide monomers or polynucleotide subunits are phosphoramidite reagents.

21. A method according to claim 17 wherein said second reagent and said fourth reagent are an activation agent.

22. A method according to claim 21 wherein said activation agent is tetrazole.

23. A method according to claim 17 wherein X is 1 to about 25.

24. A method according to claim 17 wherein Y is 1 to about 25.

25. A method according to claim 17 wherein N is about 3 to about 50.

26. A method according to claim 17 wherein M is about 1 to about 30.

27. A method according to claim 17 wherein A is about 5,000 to about 40,000 times per second.

28. A method according to claim 17 wherein B is less than 0.75 times A.

29. A method according to claim 17 wherein T is about 120 millimeters per second to about 2 meters per second.

30. A method according to claim 17 wherein U is at least 1.5 times T.

31. A method according to claim 17 wherein said dispensing elements are nozzles.

32. A method according to claim 17 wherein said first cycle and said second cycle each comprise at least one wash step, which may or may not involve said droplet dispensing elements.

33. A method according to claim 17 for synthesizing an array of polynucleotides on the surface of a support.

34. A method according to claim 33 wherein said first cycle and said second cycle comprise at least one step of applying an oxidizing agent to said surface, which may or may not involve said droplet dispensing elements.

35. A method according to claim 17 for the synthesis of polynucleotides on said surface further comprising the steps of subjecting said surface to an oxidizing agent and subjecting said surface to an agent for removing a protecting group, each of which steps may or may not involve said droplet dispensing elements.

36. A method according to claim 17 wherein said biopolymers are synthesized on said surface in multiple arrays and said support is subsequently diced into individual arrays of biopolymers on a support.

37. A method according to claim 17 further comprising exposing the array to a sample and reading the array.

38. A method comprising forwarding data representing a result obtained from a reading of the array by a method of claim 37.

39. A method according to claim 38 wherein the data is transmitted to a remote location.

40. A method comprising receiving data representing a result of a reading an array by a method of claim 37.

* * * * *